United States Patent [19]

Miyamoto et al.

[11] Patent Number: 5,679,992
[45] Date of Patent: Oct. 21, 1997

[54] BEARING UNIT

[75] Inventors: Matsutaro Miyamoto, Fujisawa; Shun-ichi Aiyoshizawa, Tokyo; Toshiharu Nakazawa, Chigasaki, all of Japan

[73] Assignee: Ebara Corporation, Tokyo, Japan

[21] Appl. No.: 729,031

[22] Filed: Oct. 9, 1996

[30] Foreign Application Priority Data

Oct. 11, 1995 [JP] Japan ...................... 7-289343

[51] Int. Cl.⁶ .................... H02K 7/08; H02K 7/09
[52] U.S. Cl. ............................. 310/90.5; 310/90
[58] Field of Search ...................... 310/90, 90.5

[56] References Cited

FOREIGN PATENT DOCUMENTS 0 396 849   11/1990   European Pat. Off. .
0 470 637   2/1992    European Pat. Off. .

*Primary Examiner*—Clayton E. LaBalle
*Attorney, Agent, or Firm*—Oblon, Spivak, McClelland, Maier & Neustadt, P.C.

[57] ABSTRACT

A magnetic bearing unit is disclosed which comprises a rotor supported in a radial direction by magnetic effects generated by permanent magnets arranged within a passive radial magnetic bearing and supported in an axial direction by an actively-controlled axial magnetic bearing. The unit also comprises a movable member arranged between the stator and rotor, and the passive magnetic member is arranged between the movable member and the rotor. At least first and second pairs of axially opposing faces are provided on the stator and the movable member respectively. A biasing means is in functional association with the movable member for forcing the movable member to shorten a spacing between the first pair of opposing faces. The first pair of opposing faces is formed with a recess having a curved cross sectional shape on each of the opposing faces, and a plurality of balls having a radius not more than a radius of the recess are disposed in the recess. The second pair of opposing faces are bridged with a damping member made of an elastic material. The resulting bearing unit in such a compressive state can be used in any orientation without causing any operational problems such as those encountered when the conventional magnetic bearing is used in a horizontal orientation. The unit is easy to control and produces stable smooth operation in radial and axial directions at all times.

10 Claims, 4 Drawing Sheets

BEARING UNIT

BACKGROUND OF THE INVENTION

1. Field of the Invention

The present invention relates in general to a magnetic bearing, and relates in particular to a magnetic bearing unit suitable for applications in sealed vacuum systems such as turbo-molecular pumps.

2. Description of the Related Art

A type of magnetic bearing, in which a "passive" magnetic bearing having permanent magnets within to generate a radial force to support the rotation axis in a radial direction and an "active" magnetic bearing to generate an axial resistance force to resist an axial force for actively controlling the rotation axis in the axial direction, is often referred to as a uniaxial control-type magnetic bearing.

The passive bearing utilizes the radial repulsive force generated between two permanent magnets provided in the rotor and in the stator, but there is no acting force between them in the axial direction. However, in the passive bearing, if a relative displacement is generated between the rotor and the stator because of, for example, the precision limitation in fabricating the component parts, an axial magnetic force is generated between the permanent magnets which affects the magnetic field of the permanent magnets, causing an instability in controlling the operation of the bearing unit. Therefore, in order to have the rotor levitated securely, it is most preferable to keep the rigidity of the member which supports the stator-side of the permanent magnets in the axial direction as high as possible.

On the other hand, for the system for supporting the rotor in the radial direction, the magnetic force offered by the permanent magnets themselves does not provide any damping factor, and once the rotor begins to swing wildly at a certain rotational speed (at the resonance point) and should the rotor touch the protective bearing at this stage, screeching noise is generated and the rotational speed can no longer be increased.

Therefore, it is necessary that the rotor-bearing mechanism be provided with a damping mechanism for generating different capabilities for position-retention in the radial and in the axial directions. An example of such a mechanism is disclosed in a Japanese Laid-Open Patent Application, H2-125106, which comprises an intermediate component member disposed between a rotor and a stator, and a damping member disposed between the intermediate component member and the rotor for producing a damping effect. This system utilizes the magnetic coupling generated between the stator and the intermediate component member for centering of the intermediate component member within the stator.

However, such a bearing unit must be able to function for centering the rotor in its any attitude, even when the apparatus in which the bearing unit is installed is horizontally-oriented, for example. Also, from the viewpoints of emphasizing maintenance and productivity, it is especially important that the bearing unit has a reproducible centering function when reassembling the apparatus. In this respect, the conventional bearing unit such as the one described above presented a serious problem that it has been difficult to reproduce the precision in centering in reassemble because the rotor is supported by way of the intermediate component member which is held in place through a magnetic elastic coupling.

SUMMARY OF THE INVENTION

It is an object of the present invention to provide a magnetic bearing unit which provides a stable operation in any orientation, from vertical to horizontal, while maintaining exact centering to assure reliable control of rotational speeds.

The object has been achieved in a magnetic bearing unit comprising: a fixed member; a rotating member relatively rotating to the fixed member, the rotating member being supported in a radial direction by magnetic effects generated by permanent magnets arranged within a passive radial magnetic bearing member and supported in an axial direction by an actively-controlled axial magnetic bearing member; a movable member arranged between the fixed member and the rotating member, the passive magnetic member being arranged between the movable member and the rotating member, at least first and second pairs of axially opposing faces being provided, each opposing face being respectively on the fixed member and the movable member; and a biasing means in functional association with the movable member for forcing the movable member to shorten a spacing between the first pair of opposing faces; wherein the first pair of opposing faces is formed with a recess having a curved cross sectional shape on each of the opposing faces, a plurality of balls having a radius not more than a radius of the recess are disposed in the recess, and the second pair of opposing faces are bridged with a damping member made of an elastic material.

According to the bearing unit, the first pair of opposing faces and the balls are made to contact intimately by the action of the biasing device so as to produce a cantilever type suspension effects to hold in place within the fixed member. The opposite end of the movable member is free to move somewhat in the radial direction, thereby providing energy absorption brought about by the action of the damping member.

An aspect of the bearing unit is that the permanent magnets in the passive radial bearing member and in the movable members are arranged in an offset position in an axial direction with respect to each other so that they may act as a biasing device. By simply changing the axial position of the passive radial bearing member, a strong biasing means can be formed.

Another aspect of the bearing unit is that the rotating member is provided with at least two of the movable member disposed separately along the axial direction, thus increasing the stability of the bearing unit.

Another aspect of the bearing unit is that a third pair of axially opposing faces is disposed respectively on the movable member and the rotating member in an opposite orientation to the first pair of opposing faces; and the third pair of opposing faces is provided with a recess having a curved cross sectional shape in a radial cross section, and a plurality of balls are disposed within the recess. Because the first and the third pairs of opposing faces are in opposite orientation to each other, the movable members are fixed in place with respect to the fixed member by two sets of balls so that one set in the first pair of opposing faces are in compression and the other set of balls in the third pair have some slack. The slack distance can be absorbed with a small quantity of deviation in the radial direction by selecting diameter difference of the recess and balls or spacing distance between those opposing faces.

Another aspect of the bearing unit is that the damping members are placed in compression in the second pair of opposing faces to act as a biasing device, thus utilizing all the components at their high efficiency.

Another aspect of the bearing unit is that the recess is formed so as to extend in the circumferential direction, thereby providing a uniform action in all directions.

Another aspect of the bearing unit is that the damping device is cylindrical in shape so that the damping effects can be generated isometrically.

Another aspect of the bearing unit is that the damping device is attached to the recess by fitting in each groove formed in the second pair of opposing faces so that it can produce strong mechanical coupling.

Another aspect of the bearing unit is that emergency protection bearing members are provided in such a way that the movable member and the protection bearings are integral so as to facilitate centering and assure precision in reassemble.

The final aspect of the bearing unit is that a sum of a spacing distance in a radial direction between the rotating member and the emergency protection bearing member and a spacing distance between the movable member and the fixed member is not more than a spacing distance in a radial direction between the rotating member and the fixed member so that even when the rotating member vibrates severely, there will be no contact between the rotor and the stator.

DESCRIPTION OF THE PREFERRED EMBODIMENTS

Figure 1:
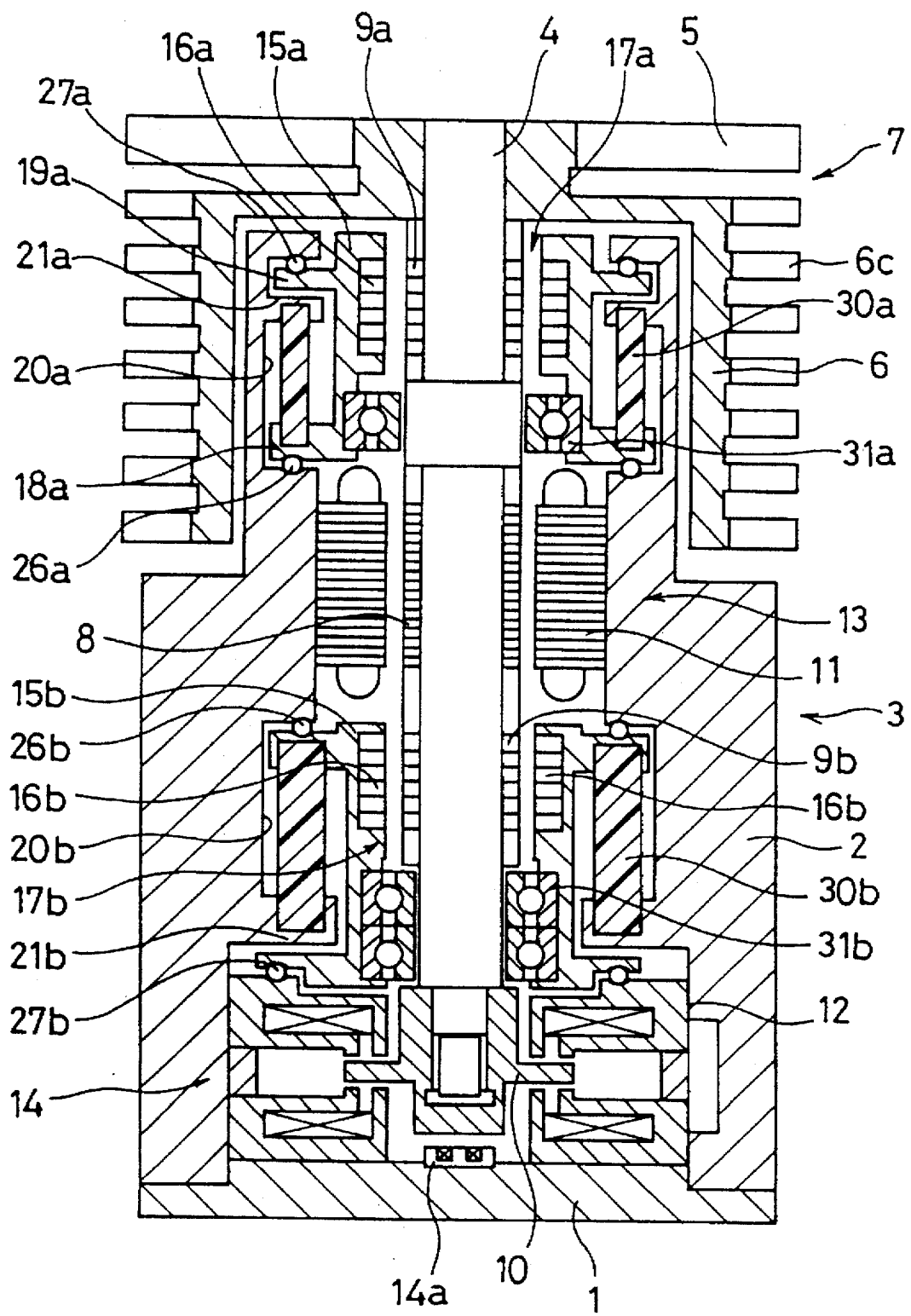
FIG. 1 is a cross sectional view of a bearing unit of the present invention applied to a turbo-molecular pump.

FIG. 1 shows an embodiment of the bearing unit of the present invention applied to a turbo-molecular pump, and the unit comprises: a stator (fixed member) 3 having a bottom 1 and a cylindrical side wall 2; and a rotor (rotating member) 7 having a main shaft 4, a circular plate section 5 and a cylindrical section 6 including a plurality of impellers 6c. In the drawing, the main shaft 4 is oriented vertically, however, this is only for the purpose of illustration and explaining the positional relation for the top and bottom sections of the apparatus, and does not mean that the unit can be operated only in this orientation. It should also be remembered that the component parts in the top section of the bearing unit are given a suffix "a or A" and the components parts in the bottom section are given a suffix "b or B" to indicate their respective place in the unit.

The main shaft 4 is provided with a motor-rotor 8 in the center section, and a pair of top permanent magnets 9a and the bottom permanent magnets 9b to radially support the rotor 7, which are referred as the rotor-side permanent magnets 9a, 9b. The bottom end of the main shaft 4 incorporates an assembled axial disc 10 for attachment to the main shaft 4. In the meantime, the stator-side of the bearing unit is provided with a motor-stator 11 to positionally correspond with the motor-rotor 8, and an electromagnet 12 is provided on the bottom region to surround the axial disc 10. Accordingly, the bearing unit is provided between the rotor 7 and the stator 3 with a motor section 13 in the middle section of the unit for the purpose of rotational drive thereof, and an axial magnetic bearing 14 in the bottom region of the unit for the purpose of axial support thereof.

The axial magnetic bearing 14 is provided with an axial displacement sensor 14a to detect the axial position of the rotor 7 and the output signal from the sensor 14a is forwarded to a controller for feedback control of the axial magnetic bearing 14. The levitating force for the rotor 7 in the axial direction is controlled to maintain the axial position of the rotor 7 by regulating the attraction force of the upper and lower electromagnets 12 according to the output signal. In other words, the axial magnetic bearing 14 conducts an active control of the levitated position of the rotor by regulating the position of the rotor 7 in accordance with the signals generated by the position sensor.

Figure 2:
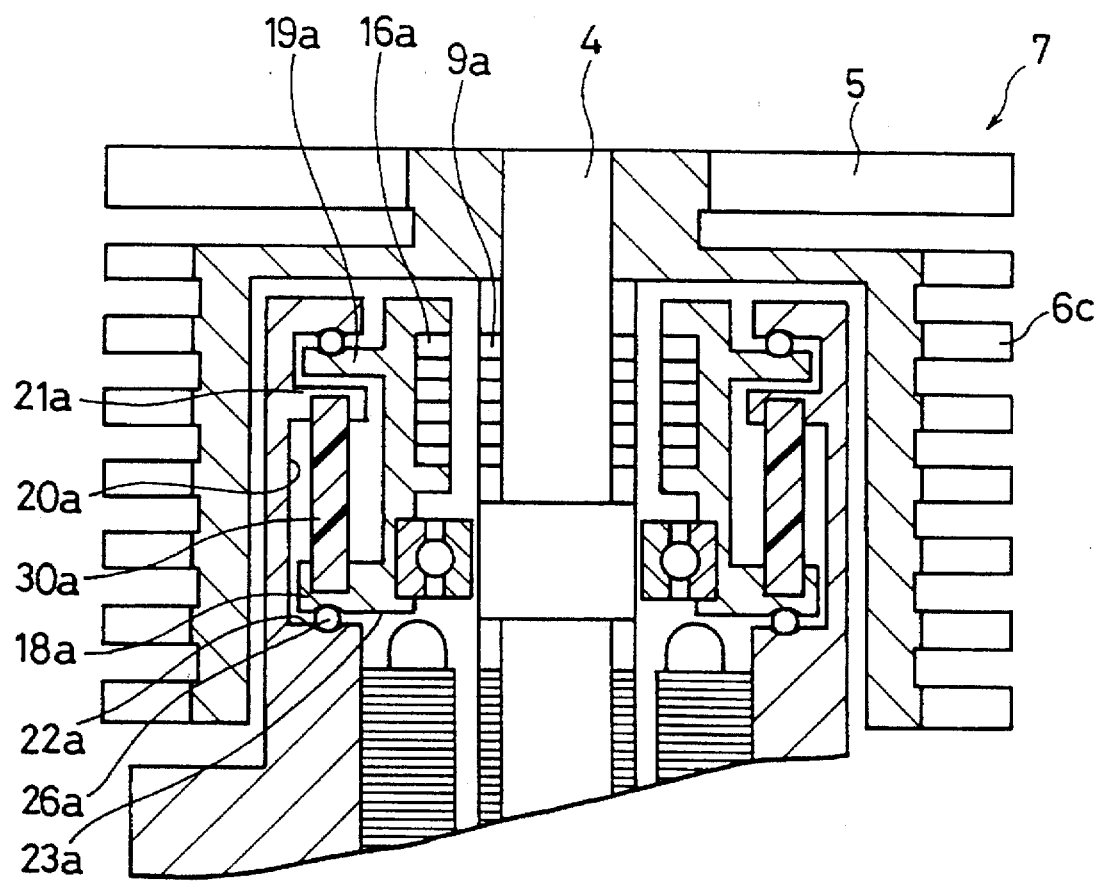
FIG. 2 is an enlarged view of the upper section of the apparatus shown in FIG. 1.
Figure 3:
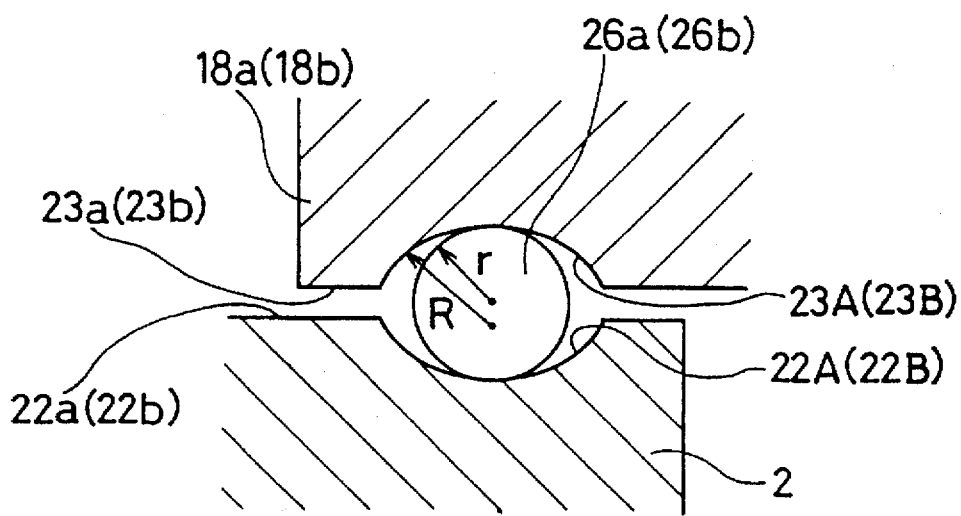
FIG. 3 is a further enlarged detail view of the upper section shown in FIG. 2.

Between the rotor 7 and the stator 3, there are disposed an upper movable member 15a and a lower movable member 15b. These members are cylindrical in shape and are made of a material such as high toughness metals, and a plurality of ring-shaped permanent magnets 16a, 16b are attached to the interior surface thereof, and these permanent magnets in combination with the permanent magnets 9a, 9b on the main shaft 4 constitute a passive radial bearings 17a, 17b seen in the cross sectional drawing shown in FIGS. 1 and 2. The permanent magnets on the rotor-side and the stator-side are installed so that the like poles face each other (for example, an N-pole of the rotor 7 faces an N-pole of the stator 3), thereby maintaining the rotor 7 in the central position by the repulsive forces between the like poles.

Figure 4:
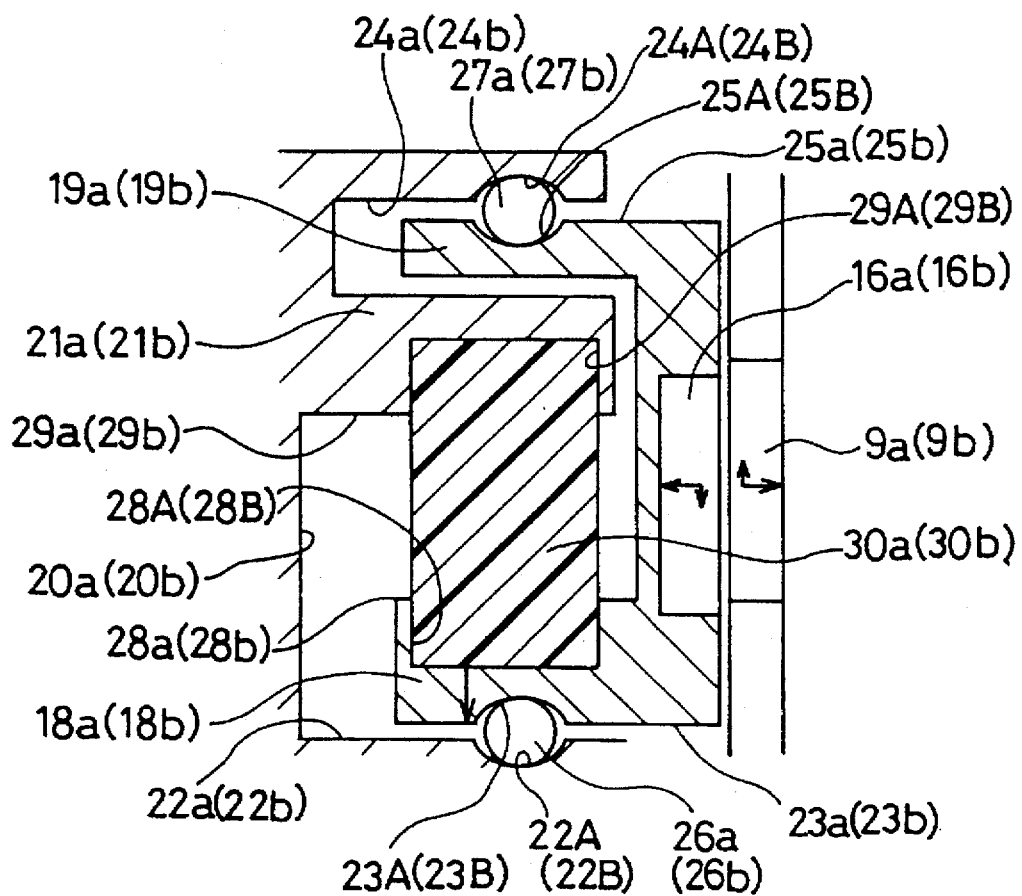
FIG. 4 is an enlarged view of the compression and biasing sections in FIG. 2.

On the external surfaces of each of the movable members 15a, 15b, there are outer discs 18a, 18b, 19a, 19b which protrude radially outward in the upper and lower sections of the movable members. Recesses 20a, 20b are formed, respectively, on the interior surface of the cylindrical wall 2 of the stator 3 to positionally correspond with these outer discs 18a~19b. There are inner discs 21a, 21b extending inwardly from the center of the recesss to protrude into the spacings between the outer discs 18a~19b. With reference to FIG. 4, circumferential grooves (recesses) 22A, 22B, 23A, 23B, 24A, 24B, 25A, 25B having arcuate sectional shape are formed, respectively: on the bottom surfaces 22a, 22b on the recesses 20a, 20b; on the bottom surfaces 23a, 23b of the lower outer discs 18a, 18b; top surfaces 24a, 24b of the recesses 20a, 20b; and the upper surfaces 25a, 25b of the upper outer discs 19a, 19b. These circular grooves are provided with small balls 26a, 26b, 27a, 27b having a radius which is smaller than the radius R of the circular grooves, arranged in the peripheral direction of the grooves 22A~25B.

The surfaces 22a, 22b, 23a, 23b construct a first pair of opposing faces, and the surfaces 28a, 28b, 29a, 29b construct a third pair of opposing faces. These first and second pairs of opposing surfaces are in an opposite orientation to each other, that is, the first pair of opposing faces 22a, 22b, 23a, 23b is directed downward and the third pair of opposing faces 28a, 28b, 29a, 29b is directed upward when seen from the stator 3 to the movable member 15a.

Attachment grooves 28A, 28B, 29A, 29B having a rectangular cross sectional shape are provided on the top surfaces 28a, 28b of the lower outer discs 18a, 18b and the bottom surfaces 29a, 29b of the inner discs 21a, 21b to extend in the peripheral direction. The surfaces 28a, 28b, 29a, 29b construct a second pair of opposing faces. The attachment grooves 28A, 28B, 29A, 29B are elastically fitted with cylinder-shaped damping members 30a, 30b made of an elastic material such as synthetic rubber. The dimension of the damping members 30a, 30b is chosen in a manner that they are installed to be in compression between the opposing faces 28a–29b, so that the movable members 15a, 15b are biased downwards by the forces exerted by the damping members 30a, 30b.

The dimensions of the spacings formed between the circumferential grooves 22A–25B and the balls 26a–27b are determined by the distances of the top and bottom surfaces of the recesss 20a, 20b, the distances of the top surfaces 25a, 25b of the upper outer discs 19a, 19b and the lower surfaces 23a, 23b of the lower outer discs 18a, 18b, the depth of the circumferential grooves 22A–25B, and the radius of the balls 26a–27b. The dimensions are chosen so as to produce spacings of very minute size. These spacings are required to achieve the damping effect by the damping members 30a, 30b and their sizes are determined by considering the difference in the radii (R-r) of the circumferential grooves 22A–25B and the radius of the balls 26a–27b. This will be explained in more detail later. The radius of the balls and curvature of the grooves can be made different to suit each application.

Figure 5:
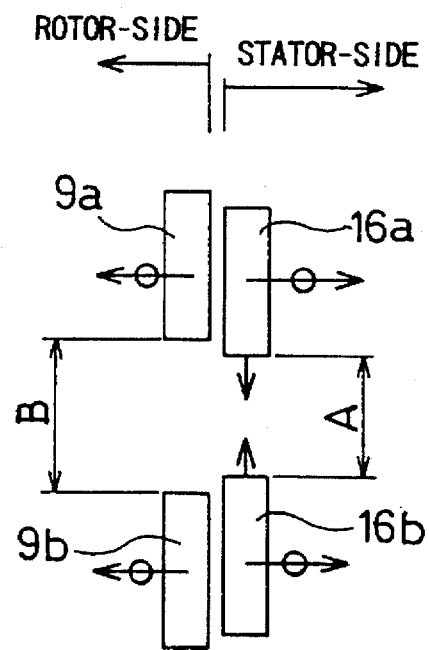
FIG. 5 is an illustration of an arrangement for the top and bottom movable components.

As shown in FIG. 5, the spacing distance B between the rotor-side permanent magnets 9a, 9b is slightly different than the spacing distance A on the upper and lower stator-side permanent magnets 16a, 16b of the movable members 15a, 15b. In this example, the dimension of the spacing distance on the rotor-side is larger than that on the stator-side. It follows therefore that when the rotor 7 is levitated, the permanent magnets 16a, 16b of the movable members 15a, 15b are subjected to a force acting from the rotor-side towards the axial center (i.e. towards the motor section), thus biasing the movable member 15a, 15b in such a direction as to shorten the distances between the first opposing faces 22a, 23a, 22b, 23b. In this condition, the circumferential grooves 22A–22B on the first opposing faces come into intimate contact with the balls 26a, 26b so as to produce the centering action, and the spacings are now generated between the circumferential grooves 24A–25B on the third opposing faces 24a–25b and the balls 27a, 27b.

Figure 6:
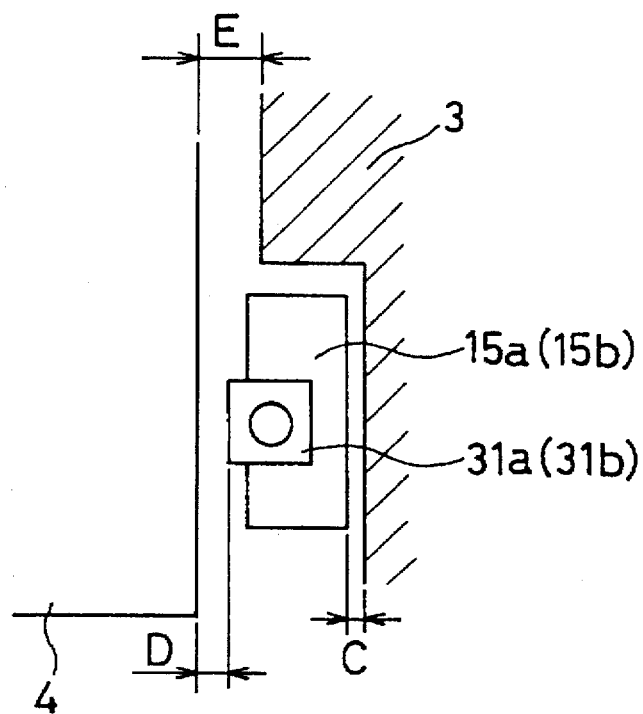
FIG. 6 is an illustration to show the emergency protection bearing member in relation to the rotor and the stator.

As shown in FIG. 1, each of the movable members 15a, 15b is provided, respectively, with a protection bearing member (emergency protection bearing member) 31a, 31b in order to prevent a direct contact between the rotor 7 and the stator 3 by restricting the degree of displacement of the rotor 7, when the rotor 7 is not levitated or when there is an excess amount of vibration generated in the rotor 7. As shown in FIG. 6 in more detail, the radial spacing C between the movable member 15a, 15b and the stator 3, the spacing D between the rotor 7 and the movable members 15a, 15b and the spacing E between the rotor 7 and the stator 3 are related by a relation such that E>C+D. This relation is chosen so that even if the rotor 7 is subjected to a large displacement, the rotor 7 does not contact the stator 3.

The operation of the bearing unit having the construction present above will now be explained.

For example, as shown in FIG. 1, when the unit is to be operated with the main shaft 4 oriented vertically, the rotor 7 is in the down-position by gravity when not operated, therefore, the active axial bearing 14 is activated to lift the rotor 7 in the specific position. Consequently, the displacement of the permanent magnets as described above causes the movable members 15a, 15b to be biased towards the axial center. In this condition, the grooves 22A–23B on the first opposing faces 23a, 23b and the balls 26a, 26b come into close contact with each other, and the movable members 15a, 15b are thus centered, thereby producing accurate centering by the action of the passive radial bearing members 17a, 17b.

It should be noted that the small amount of compression in the axial direction given to the damping members 30a, 30b producing the biasing effect of the damping members contributes also to the centering effect. Another contributing factor is that the damping members 30a, 30b are coupled to the movable members 15a, 15b and the stator 3 by a mechanical coupling attachment to the attachment grooves 28A–29B so as to produce a high degree of precision in positioning.

When the motor section 13 is activated in this condition to operate the rotor 7, resonant vibration is generated at a certain rotational speed in the radial direction of the main shaft 4, however, this vibrational energy is absorbed by the damping members 30a, 30b, thus maintaining a stable operation of the bearing unit. By choosing the radius, length, thickness or material properties for the damping members 30a, 30b appropriately, it is possible to customize the energy absorbing characteristics for different applications.

As explained above, the cross sectional shape of the bearing unit is such that the circumferential grooves 22A, 23B accommodating the balls 26a, 26b on the first opposing faces 22a, 23b is an arc with a radius R which is minutely larger than the radius r of the balls. Centering of the movable members 15a, 15b with respect to the stator 3 is thus achieved by the mutual interaction between the balls and the grooves, as well as restricting the amount of radial movement so as to maintain the centered state.

The damping members 30a, 30b are made of an elastic cylinder whose one end is fixed to the movable member 15a, 15b while the opposite end is fixed to the stator 3 so that the damping members 30a, 30b are supported by a cantilever suspension. In this arrangement, if the movable members displace in the radial direction, the entire cylindrical damping members are made to deform thus consuming the deformation energy most effectively as a unit, thereby allowing to exhibit a maximum damping capacity. This arrangement also permits the retention rigidity of the movable members 15a, 15b to be retained small within a minute radial distance range, thereby effectively reducing the vibration of the rotor 7.

The bearing unit having the design presented above can be operated in any desired orientation, in a horizontal or slanted orientation by using essentially the same operational procedure. In this case, the presence of the minute spacing between the third opposing faces 24a–25b generates a minute shift of the main shaft in the radial direction; however, the degree of shift is governed by the dimension of the minute spacing given by the difference between the radii of the circumferential grooves 24A–25B and the balls 27a, 27b. In practice, the dimensions of the spacings and the radius difference are chosen so that any radial shift which might occur would not interfere with the operational characteristics of the bearing unit.

If, for any reason, the main shaft 4 should exhibit abnormal vibration resulting in a shift in the radial direction, the sum of C and D is less than the radial spacing between the rotor 7 and the stator 3, as explained above, thus there is no danger that the revolving rotor 7 comes into a direct contact with the fixed stator 3, by being safely supported by the protection bearing 31a, 31b. By constructing the protection bearing members 31a, 31b (emergency protection bearings) integrally with the movable member 15a, 15b, it facilitates centering of the stator-side of the unit, that is, centering between the permanent magnets 16a, 16b on the movable members 15a, 15b and the protection bearings 31a, 31b. Also, high precision in manufacturing the protection device is possible by suitably managing the shapes and the dimensions of the movable members 15a, 15b and the stator 3.

In summarizing the structural features of the bearing unit of the present invention, the rotor in the radial direction is supported by a passive bearing component utilizing permanent magnets, and the stability in the axial direction is provided by an active bearing component having electromagnets and displacement sensors. The bearing unit of such a construction produces the following advantages.

(1) The bearing unit has been developed by resolving two conflicting requirements that it is necessary to control the vibration of the unit by absorbing vibrations of the main shaft in the radial direction while minimizing the displacement in the radial direction to facilitate centering of the main shaft. The result is an uniaxial control-type magnetic bearing unit that facilitates operational control and assures smooth operation of the unit.

(2) The bearing unit improves the production efficiency by facilitating centering of the stator-side permanent magnets and the emergency protection bearing members with respect to the stator as well as offering reliability in reassembling of the unit.

(3) The bearing unit is constructed simply and the movable members and the stator are not magnetically coupled, thus enabling to miniaturize the bearing unit.

(4) The bearing unit is constructed so that it is not significantly affected by external vibration, thus enabling to apply the unit under a variety of operating environmental conditions as well as to use the unit in any desired orientation.

What is claimed is:

1. A bearing unit comprising:

a fixed member;

a rotating member relatively rotating to said fixed member, said rotating member being supported in a radial direction by magnetic effects generated by permanent magnets arranged within a passive radial magnetic bearing member and supported in an axial direction by an actively-controlled axial magnetic bearing member;

a movable member arranged between said fixed member and said rotating member, said passive radial magnetic bearing member being arranged between said movable member and said rotating member, at least first and second pairs of axially opposing faces being provided, each opposing face being respectively on said fixed member and said movable member;

a biasing means in functional association with said movable member for forcing said movable member to shorten a spacing between said first pair of opposing faces;

wherein said first pair of opposing faces is formed with a recess having a curved cross sectional shape on each of said opposing faces, a plurality of balls having a radius not more than a radius of said recess are disposed in said recess, and said second pair of opposing faces are bridged with a damping member made of an elastic material.

2. A bearing unit as claimed in claim 1, wherein said permanent magnets in said rotating member and permanent magnets disposed in said movable member are offset in an axial direction so as to form said biasing means.

3. A bearing unit as claimed in claim 1, wherein said rotating member is provided with at least two of said movable member disposed separately along the axial direction.

4. A bearing unit as claimed in claim 1, wherein a third pair of axially opposing faces is disposed between said movable member and said rotating member in an opposite orientation to said first pair of opposing faces; and said third pair of opposing faces is provided with a recess having a curved cross sectional shape in a radial cross section, and a plurality of balls are disposed within said recess.

5. A bearing unit as claimed in claim 1, wherein said biasing means comprises said damping member installed between said second pair of opposing faces so as to be in a state of compression.

6. A bearing unit as claimed in claim 1, wherein said recess is formed as a groove extending circumferentially on said opposing faces.

7. A bearing unit as claimed in claim 1, wherein said damping member is in a cylindrical shape.

8. A bearing unit as claimed in claim 1, wherein said damping member is attached to the recess by fitting in each groove formed in the second pair of opposing faces.

9. A bearing unit as claimed in claim 1, wherein said movable member is provided with an emergency protection bearing member.

10. A bearing unit as claimed in claim 9, wherein a sum of a spacing distance in a radial direction between said rotating member and said emergency protection bearing member and a spacing distance between said movable member and said fixed member is not more than a spacing distance in a radial direction between said rotating member and said fixed member.

* * * * *